United States Patent

[11] 3,599,465

| [72] | Inventor | Paul A. Chenevier<br>Sydney, New South Wales, Australia |
|---|---|---|
| [21] | Appl. No. | 816,900 |
| [22] | Filed | Apr. 17, 1969 |
| [45] | Patented | Aug. 17, 1971 |
| [73] | Assignee | Aluminum Textures, Inc.<br>Grand Rapids, Mich. |

[54] METHOD AND APPARATUS FOR FORMING PATTERNS IN METAL PANELS
22 Claims, 8 Drawing Figs.

[52] U.S. Cl.................................................. 72/207, 72/161, 72/363
[51] Int. Cl................................................... B21b
[50] Field of Search........................................... 72/160, 161, 184, 192, 207, 363

[56] References Cited
UNITED STATES PATENTS

| 543,607 | 7/1895 | Bates........................... | 72/207 |
| 1,807,141 | 5/1931 | Wood........................... | 72/197 |
| 1,921,486 | 8/1933 | Seiferth........................ | 72/207 |
| 2,701,485 | 2/1955 | Felt et al...................... | 72/207 |
| 2,799,317 | 7/1957 | Toulmin, Jr. ................. | 72/207 |

*Primary Examiner*—Charles W. Lanham
*Assistant Examiner*—Michael J. Keenan
*Attorney*—Price, Heneveld, Huizenga & Cooper ABSTRACT: A machine and a method for embossing sheet aluminum in which an embossing die having a pattern or design formed by etching or machining is placed on a movable table, a sheet of aluminum is placed on the embossing die, and the die and sheet of aluminum is progressivley compressed by rolling over said sheet of aluminum a large, cylindrical compression roller; then the embossed sheet of aluminum is distressed in curving and straightening rollers.

INVENTOR.
PAUL A. CHENEVIER
BY
*Price, Heneveld*
*Huizenga & Cooper*
ATTORNEYS

INVENTOR.
PAUL A. CHENEVIER
BY Price, Heneveld
Huizenga & Cooper
ATTORNEYS 3,599,465

METHOD AND APPARATUS FOR FORMING PATTERNS IN METAL PANELS

BACKGROUND

This invention relates to embossing. Embossing is the process of producing raised patterns or letters on metal surfaces. In the consumer-oriented industries, there is a tremendous demand for panels of embossed aluminum. These are used on stoves, refrigerators, washing machines, appliances, etc. One method of producing such panels involves the use of mating embossing wheels or engraving rolls. This involves the use of two rolls or wheels, both of which have patterns engraved on their surfaces. One heel has a male engraving while the other has a female engraving. These wheels must be very carefully made since the male pattern must coincide exactly with the female pattern. In addition, the two wheels must be intricately geared in order that the male pattern and the female pattern are exactly synchronized. Further, the making of the pattern on the roll is very expensive. When a piece of aluminum is passed between the two rotating wheels, the male pattern then tends to force the aluminum into the female pattern. Because of the necessity of perfect mating and synchronization, these embossing wheels are extremely expensive to produce. Thus, the manufacturer using these dies is extremely limited in the variety of patterns which he can offer. Furthermore, because of this great expense, the manufacturer must frequently be satisfied with wheels of smaller circumferences. Hence, the variety of designs is further limited in that the pattern on the rolls must repeat itself when moving from one end of an aluminum panel to the other. This also tremendously curtails the manufacturer's ability to print lengths of indicia on his embossed panels.

The other known means of embossing aluminum utilizes male and female punch press dies. This is somewhat more versatile since cutting, forming, and embossing can all be done in a single operation if desired. However, it is still extremely expensive in that the mating tolerances between the male and female dies are extremely close. Furthermore, if one is manufacturing embossed panels which require only a planar configuration, the ability to cut and form simultaneous to embossing is of little value. Thus, because of the tremendous expense of producing mating dies, the manufacturer is still extremely limited both in the variety of patterns which he can offer and in the size of panels which he can create.

Therefore, it can be seen that there is a tremendous need for an apparatus and a method of embossing sheet aluminum which will make it possible for the panel manufacturer to offer both a greater variety of patterns and panels which themselves are not limited to a continuous, monotonous pattern or a repeating message.

SUMMARY

The present invention involves a process for embossing sheet aluminum and the like and a machine for carrying out that process. A sheet of metal having a generally smooth surface is placed adjacent to an unmated embossing die having an embossing or configurated surface, formed preferably by etching. The said smooth surface is placed adjacent to said embossing surface. First and second compression members are provided with said first compression member being generally cylindrical in shape. The sheet of metal and the die are oriented with respect to said first and second compression members such that said sheet of metal will lie between said die and said first compression member and said die will lie between said sheet of metal in said second compression member when said die and said sheet of metal are placed between said first and second compression members. The sheet of metal and die are then compressed between said first and second compression members by rolling said first compression member with respect to said sheet of metal and said die with no nonflexible barrier between said sheet of metal and said first compression member. Finally, the resulting embossed sheet of aluminum is destressed and straightened.

The most outstanding advantage of this invention is the tremendous reduction in cost since only one die is needed rather than a pair of mating dies. The need for mating and synchronized embossing dies is eliminated and an etched die can be used. Thus, a manufacturer can afford to use a die which is bigger and more varied in its pattern. He can offer a greater variety of patterned panels. He can offer long panels which are not limited to a repeating pattern. He can offer a long panel which has one pattern at one end and another at the other. He can offer a long panel with a variety of embossed indicia and any number of other irregularities. The variety of his products can be increased tremendously.

DRAWINGS

These and other advantages of this invention can be seen by reference to the drawings wherein.

PREFERRED EMBODIMENT

Figure 1:
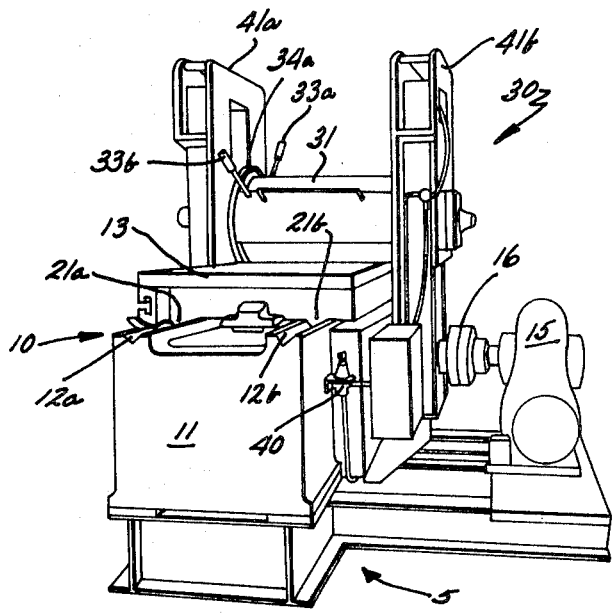
FIG. 1 is an end perspective view of the machine.
Figure 3:
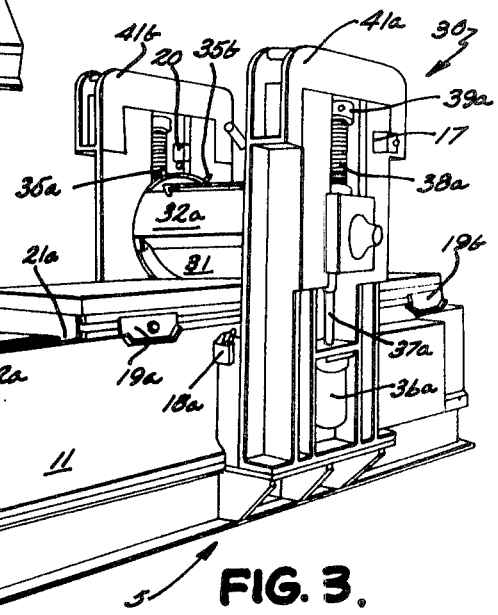
FIG. 3 is another side perspective view of the machine showing the right side of the machine and the end which does not appear in FIG. 1.
Figure 2:
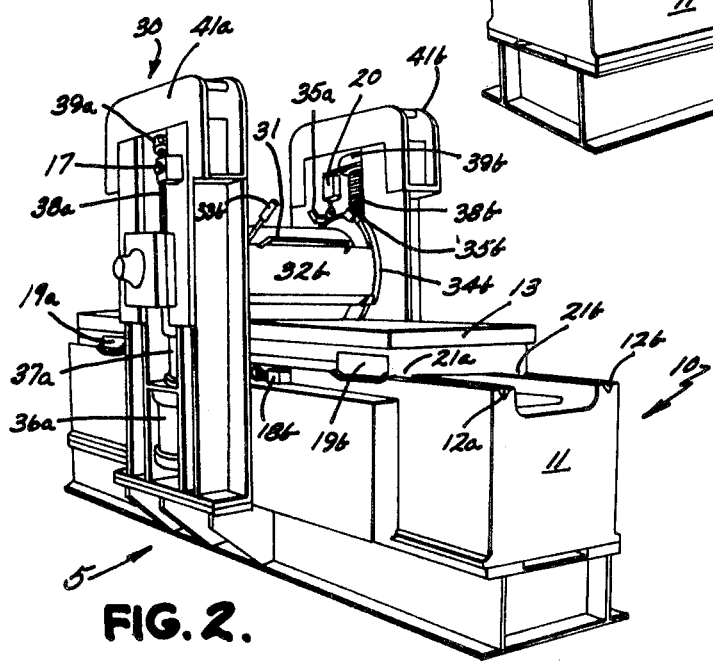
FIG. 2 is a side perspective view of the machine showing the same end which appears in FIG. 1 but showing the right side of the machine which does not appear in FIG. 1.

The basic elements of the overall machine can be seen in FIGS. 1, 2 and 3. Generally, there is a table assembly 10 including a drive system and a roller assembly 30 all mounted on a T-shaped steel foundation 5. The table assembly 10 includes a cast iron table bed 11 which is mounted on foundation 5 on the crossbar of the T. On the top of its left and right sides, it has guide grooves 12a and 12b which run its entire length. A table 13 rests atop table bed 11 and has runners 21a and 21b which run its entire length and ride in the grooves 12a and 12b such that table 13 slides in these grooves 12a and 12b. Table 13 can be moved by activating a three-phase induction drive motor 15 which is mounted on the base or stem of the T-shaped foundation 5. A drive shaft 16 extends from motor 15 through the side of table bed 11 and connects motor 15 by any conventional means (not shown) to drive table 13.

Figure 4:
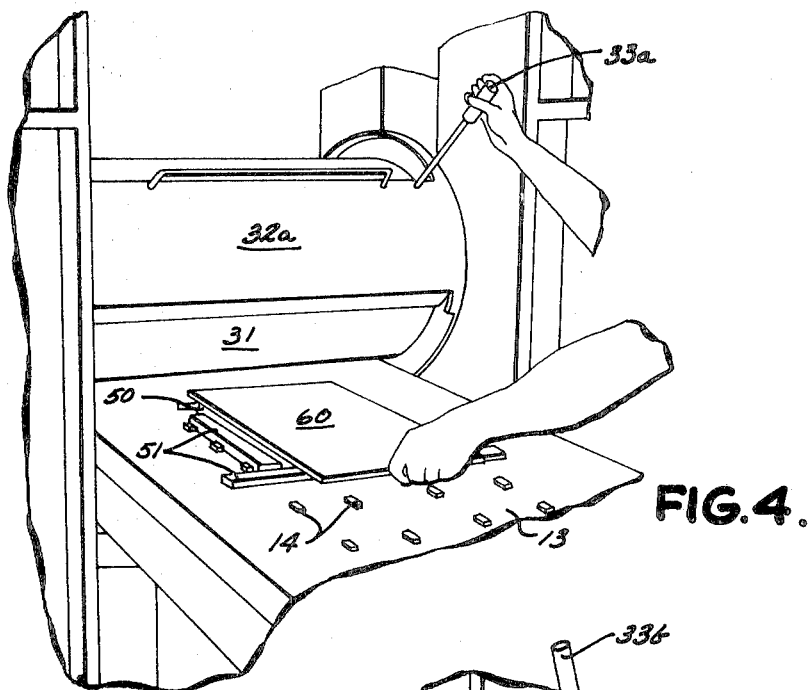
FIG. 4 is a view of a sheet of aluminum on an embossing die about to be started through the machine.
Figure 5:
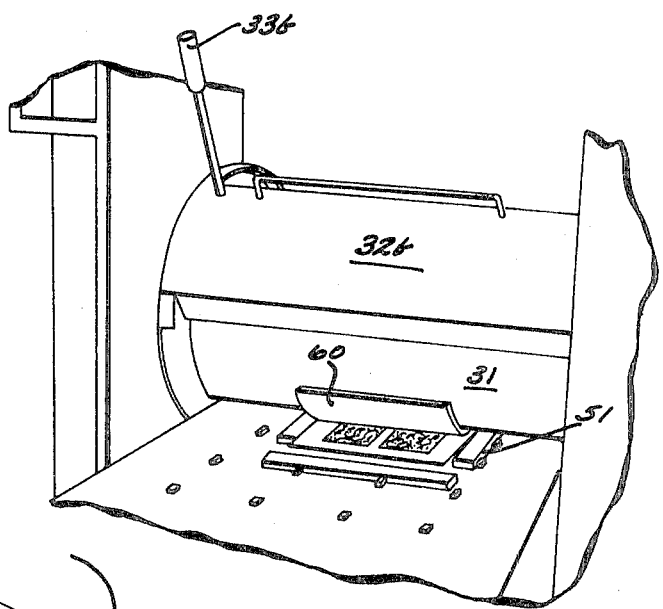
FIG. 5 is a view of the same piece of aluminum coming through the machine.

Stop limit switches 18a (FIG. 2) and 18b (FIG. 3) are mounted on the side of table bed 11 opposite the drive motor 15 on either side of tower 41a which is located in the middle of the side of table bed 11. Table limit stops 19a and 19b are also mounted near the ends of the same side of the table 13. The relative distance of each of these limits from its respective table end can be adjusted if desired. The position of table limit stops 19a and 19b is also such that if either is passed over its respective stop limit switch 18a or 18b it will strike said stop limit switch 18a or 18b. Finally on the upper surface of table 13, there are clamping bolts 14 which are shown in FIGS. 4 and 5.

The roller assembly 30 includes the cylindrical compression roller 31 made from Ni-Hard cast steel so as to withstand approximately 2 years of use before regrinding is necessary. It weighs approximately 1,500 pounds. It is mounted on cylinder supports or towers 41a and 41b such that it is free to rotate in either direction. These towers 41a and 41b are mounted on foundation 5 and on either side of table bed 11 in the middle of those sides. They extend several feet above the top of table bed 11 and table 13.

Two discs or guard supports 34a and 34b are mounted to rotate on the same axis as compression roller 31 and are disposed at either end thereof. Connected to and supported by discs 34a and 34b are guardplates 32a and 32b which are disposed generally over portions of compression roller 31, one on each side. These guardplates 32a and 32b can be raised or lowered by guard handles 33a and 33b which extend outwardly therefrom. Mounted on guard support 34b are guard limit stops 35a and 35b, disposed upwardly from guardplates 32a and 32b and on either side of a start limit switch 20 which is fastened to cylinder support tower 41b. This start limit switch 20 is adapted to be activated by either of the guard limits 35a or 35b.

Compression roller 31 can either rest directly on the table 13 or it can be supported by roller support piston rods 37a and 37b of the power cylinders 36a and 36b. Cylinder 36a and its piston rod 37a are mounted on tower 41a at its base while cylinder 36b and its piston 37b are correspondingly mounted on tower 41b. These piston rods 37a and 37b force the compression roller 31 upward until it is stopped by adjusting screws 38a and 38b mounted in towers 41a and 41b, respectively and which have larger diameters than the holes in the tops of towers 41a and 41b. These adjusting nuts 39a and 39b are equipped with small holes into which a turning lever can be fitted in order to make any desired adjustments. Support piston rods 37a and 37b are activated by compressed air which is fed into the cylinders 36a and 36b through the compressed air feed-in valve 40. This valve 40 is equipped with an escape such that air can be let out of the cylinders 36a and 36b and compression roller 31 lowered onto table 13 when the machine is not in use.

Figure 6:
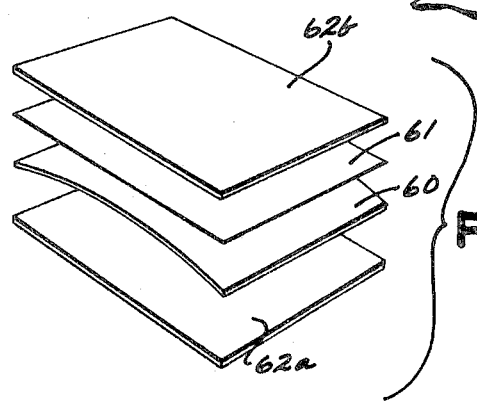
FIG. 6 is a perspective view of the sandwich which is used in the destressing operation.
Figure 7:
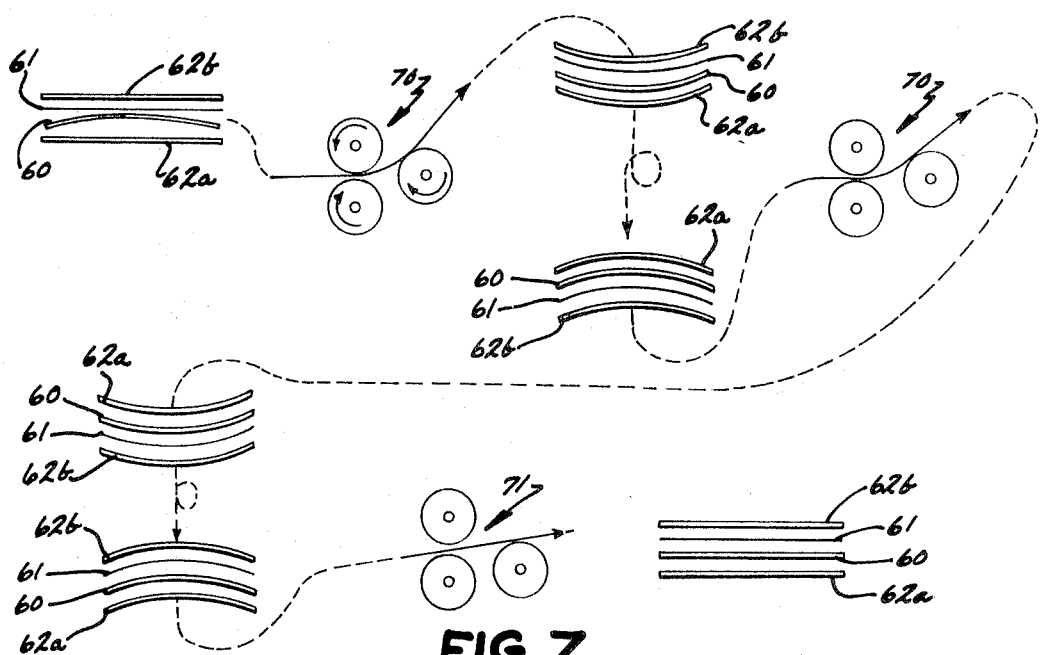
FIG. 7 is a schematic representation of the destressing operation.

FIGS. 4 and 5 show an embossing die 50 which is held in place on the table 13 by means of the clamping bolts 14 and if necessary shims 51. In these figures, a sheet of aluminum 60 is being embossed by the embossing die 50. FIG. 6 shows a destressing sandwich which includes a bottom sheet of hard aluminum 62a, the curved sheet of embossed aluminum 60, a piece of sisal paper 61 and a top sheet of hard aluminum 62b. Finally, FIG. 7 shows more or less schematic representation of the destressing sandwich of FIG. 6 being processed through curving rollers 70 and straightening rollers 71.

The ultimate first step of this operation is of course the preparation of a flat embossing die 50. If the pattern of the die is to be very light or irregular, it is helpful to leave "runners" on the die which are about ½-inch wide. This is a ½-inch border around the die which is smooth and unpatterned. These runners help to insure that the pressure on the pattern is even throughout the whole area of the die and they also help to hold the aluminum straight on the die throughout the rolling process. Thus, when the sheet of aluminum 60 is cut to size, it is also left with ½-inch runners which will not be patterned during rolling process. The average depth of the pattern on the die is from 0.003 inch to 0.005 inch. However, it is possible to provide patterns of greater depth under certain circumstances.

The type of aluminum which is generally used in this process is 1100 alloy, 0-temper in sheets approximately one thirty-second of an inch thick. Naturally, harder alloys are less desirable from an embossing standpoint. Generally, however, the process is operable on all nonheat treatable aluminum alloys. Furthermore, the process could be used on alloys of other metals having hardness maleability properties comparable to those of nonheat treatable aluminum alloys or more specifically 1100 alloy, 0-temper.

At the beginning of an operation, compression roller 31 will be resting on table 13. The operator begins his setting-up procedure by slacking off the adjusting screws 38a and 38b. This is accomplished by turning down adjusting nuts 39a and 39b away from the tops of towers 41a and 41b. The operator then opens the air valve 40 and lets air into piston cylinders 36a and 36b thereby raising pistons 37a and 37b. These lift compression roller 31 upwardly until adjusting nuts 39a and 39b are stopped by the tops of towers 41a and 42b. Then the embossing die 50 is placed on table 13 beneath the compression roller 31. It is held in place either by clamping bolts 14 directly or by squeezing shims 51 between the edges of the die 50 and clamping bolts 14. The operator must be sure that clamping bolts 14 are screwed down tightly such that the tops are below the top of the embossing die 50. A sheet of aluminum 60 is then placed on top of the embossing die 50. Air valve 40 is now opened to exhaust thereby bleeding air out of piston cylinders 36a and 36b and causing compression roller 31 to settle downwardly onto the sheet of aluminum 60 and the die 50. The adjusting nuts 39a and 39b are then turned upwardly until they are tight against the top of towers 41a and 41b. Air valve 40 is then opened again to allow compressed air to fill piston cylinders 36a and 36b and force pistons 37a and 37b in an upward direction. This acts to support compression roller 31 such that it does not fall down onto the table after rolling off the end of the sheet of the aluminum 60 and the embossing die 50. The operator then causes table 13 to move beneath the compression roller 31 thereby embossing a pattern onto the sheet of aluminum 60. At this point, the operator evaluates whether the pattern is sufficiently well defined over its entire area. If it is not, he turns adjusting nuts 39a and 39b or one or the other of them in an upwardly direction, thereby forcing the adjusting screws 38a and 38b and the compression roller 31 in a downward direction against the force of the pistons 37a and 37b. He then places another sheet of aluminum 60 onto the embossing die 50 and runs them beneath the roller. This process is repeated until the pattern of the embossing die 50 is sufficiently well defined on the sheet of aluminum 60. If there are selective areas of the pattern which are not sufficiently well defined, the operator can place strips of paper under the embossing die 50 in order to bring these areas of the pattern up. When the entire pattern is sufficiently well defined, the machine is set up for production.

Figure 8:
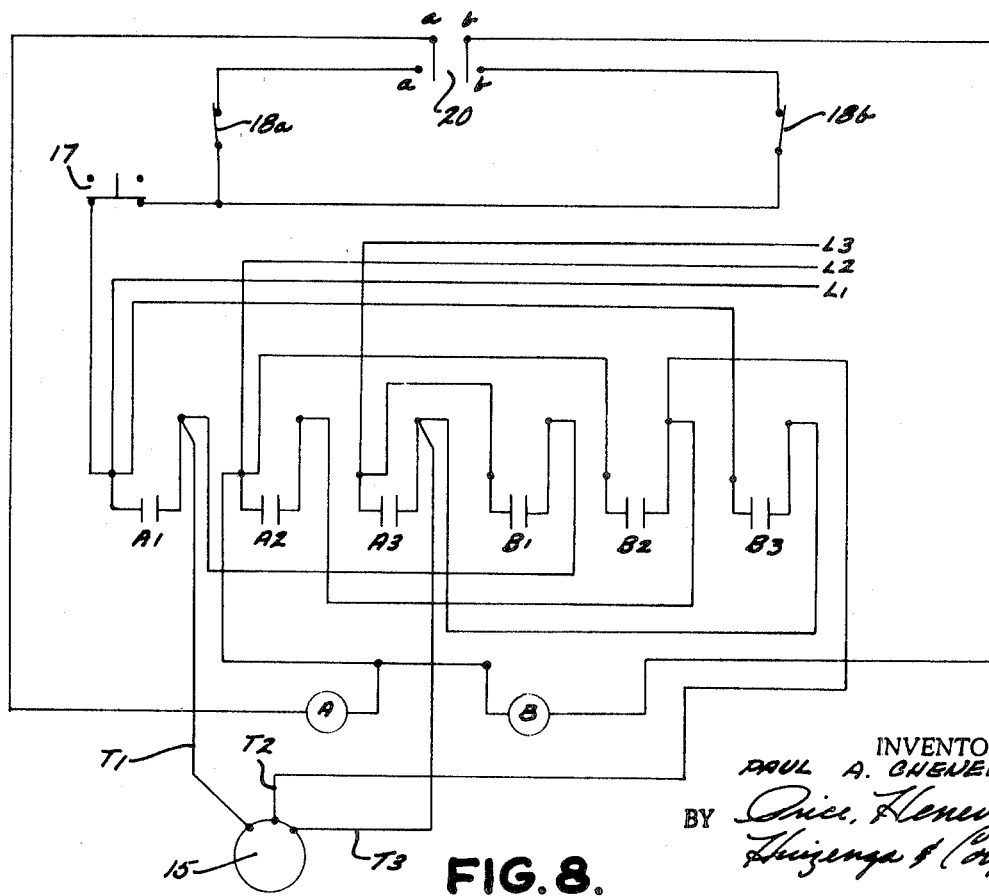
FIG. 8 is a simplified schematic diagram of the circuitry of the machine.

The means of moving the table 13 and thereby moving the embossing die 50 and the sheet of aluminum 60 beneath the compression roller 31 which was mentioned above and which is used in production can best be illustrated by reference to the simplified schematic circuitry diagram of FIG. 8. As stated before, motor 15 is a three-phase induction motor. The circuitry used to power this motor is known in the art as an AC contactor circuit. Power enters the system through the lines labeled L1, L2 and L3. Preferably, there is some sort of master power switch on these lines. The stop limit switches 18a and 18b and start limit switch 20 are contained in two parallel 110-volt circuits. As can be seen from FIG. 8, start limit switch 20 is actually two switches, since it can cause a contact across either terminals a–a or terminals b–b shown at the top of FIG. 8. Start limit switch 20 is biased to a neutral position such that normally contact is made across neither of the two pairs of terminals. However, the lowering of guard 32a by means of guard handle 33a causes guard limit 35a to contact start limit switch 20 and force it off its neutral position such that contact is made across terminals a–a. Stop limit switches 18a and 18b are both biased to a closed position. Also, there is an emergency stop button 17 which is common to both of the parallel circuits which contain the start and stop limit switches and which when pushed in breaks contact in the overall circuit. Emergency stop button 17 is mounted on tower 41a since this is a convenient location. Once pushed in, button 17 will stay in until it is manually pulled out.

When contact is made across terminals a–a as described above and if stop button 17 is pulled out, a 110-volt circuit will be completed between L1 and L2 through relay coil A. Relay coil A will then activate the normally open relay contacts A1, A2 and A3 thereby completing a 220-volt circuit through motor 15. By following the circuit through the closed contacts A1, A2 and A3, it can be seen that the power from L1 enters the motor at terminal T1 while the power from L3 enters the motor at terminal T3. The ground L2 is completed through terminal T2. This activates the motor and drives table 13 in a direction such that table limit 19a moves toward stop limit switch 18a. When table limit 19a strikes stop limit switch 18a, it forces table limit switch 18a to an open position, and as can be seen in FIG. 8, breaks the 110-volt circuit to relay coil A and thereby causes contacts A1, A2 and A3 to return to their normally open position. Obviously, this breaks the 220-volt circuit to motor 15 and causes table 13 to stop. The bulk of table 13 is now disposed on the opposite side of compression roller 31 from which it started.

To return the table to the other side of compression roller 31, one merely lowers guard 32b by means of guard handle 33b thereby causing guard limit 35a to contact start switch 20 and force it from its neutral position such that contact is made across the terminals b-b. Stop limit switch 18b is in its normally closed position since table 13 is disposed such that stop limit switch 18a is in a forced open position. Thus, it can be seen that a 110-volt circuit is completed between L1 and L2 through relay coil B. This in turn activates the normally open relay contacts B1, B2 and B3 and thus completes a 220-volt circuit to motor 15. It can be seen by following the circuit that in this case, power from L1 flows to the motor through terminal T3 rather than T1 and power from L3 flows through terminal T1 rather than T3. As before, the ground L2 is completed through terminal T2. This has the obvious effect of causing motor 15 to run but in a direction which is opposite that which it ran when relay coil A was activated. Thus, table 13 is driven in an opposite direction and table limit 19b moves toward stop limit switch 18b while table limit 19a moves away from stop limit 18a. When table limit 19b contacts stop limit switch 18b, it forces it open and thereby breaks the 110-volt circuit to relay coil B which in turn causes contacts B1, B2 and B3 to return to their normally open position. Motor 15 stops and table 13 is back in the position in which it started when contact was first made across terminals a-a. At any time when table 13 is moving in either direction, emergency stop switch 17 can be pushed in and table 13 will stop moving. The pushing in of stop button 17 breaks the power from L1 as it flows to either the A-relay circuit or B-relay circuit.

It is clear then that table 13 can be moved in either direction depending on whether a circuit is completed through relay A or relay B. As die 50 and the corresponding sheet of aluminum 60 are moved beneath roller 31 by the movement of table 13, roller 31 makes contact with die 50 and begins turning. As a precaution against movement of die 50, the ends of the die are made square to the pattern to insure that roller 31 does not strike one corner first. Preferably, a piece of wood the same thickness as the die is clamped onto table 13 adjacent to and on either end of die 50. If this is done, roller 31 strikes the wood first and it is already turning when it contacts die 50 and aluminum 60. It is not necessary for aluminum 60 to completely cover die 50 providing that all sharp edges are removed therefrom to prevent damage to roller 31.

OPERATION

Now the operation of the machine in production can be clearly visualized. With table 13 disposed such that table limit 19b is in contact with stop limit switch 18b, the worker places flat sheet of aluminum 60 having a generally smooth surface on top of embossing die 50 and generally squares said sheet of aluminum with respect to said die 50. He then lowers guard 32a using guard handle 33a and thus causes table 13 to move beneath roller 31 in a direction such that table limit 19a is moving toward stop limit switch 18a. The block of wood in front of die 50 makes contact with roller 31 and starts it turning. It continues to turn as it rolls over sheet of aluminum 60 and embossing die 50. As sheet of aluminum 60 moves beneath roller 31, the operator steadies it or guides it to some extent by hand in order to keep it from turning on die 50. As his hands approach guard 32a, he removes them and moves to the other end of table bed 11 toward which table 13 is moving unless there is already a second operator at the other side. As sheet of aluminum 60 comes through roller 31, he removes it and sets it aside for later destressing. When table limit 19a strikes stop limit switch 18a, table 13 stops moving. The operator then places another sheet of aluminum 60 on embossing die 50 and lowers guard 32b by means of guard handle 33b thereby causing table 13 to move in the opposite direction. Again, roller 31 strikes the block of wood which is disposed at the other end of embossing die 50 and begins turning and continues to turn as it rolls over the sheet of aluminum 60 and embossing die 50. The operator follows the same procedure as he did before and again moves back to the end of table bed 11 from which he started. In this fashion, the process is continually repeated and each sheet of aluminum 60 is embossed in only one pass of table 13 beneath roller 31.

If the pattern of the die is somewhat deeper than average one can still attain good definition of the pattern by either using softer and thicker aluminum or by using a backing sheet of flexible material such as a piece of red fiber one-sixteenth of an inch thick. This fiber is cut to the size of the die and is placed on top of the sheet of aluminum 60 after it is placed onto the die 50. The fiber aids compression roller 31 in forcing the sheet of aluminum into and around the deeper pattern of the embossing surface of the embossing die 50. The same piece of fiber can be used to process from 15 to 20 different sheets of aluminum. After 15 to 20 passes of compression roller 31 over the fiber the pattern on the aluminum will start to deteriorate. At this point, this first piece of fiber can be set aside and another piece of fiber can be substituted. However, the original pieces of fiber can be used again by merely resetting roller 31 to a somewhat lower position. The original piece of fiber can then be again used for 15 to 20 passes. In this way, each piece of fiber can be used to make approximately 60 sheets of embossed aluminum. After 60 passes, however, it becomes brittle and splits on the edges.

The backing material used to obtain a well-defined pattern on a deeper than average die should be of a flexible rather than a nonflexible material. The reason for this is that a nonflexible material such as a steel shim would have a definite tendency to distribute the force applied by compression roller 31 over the entire back surface of sheet of aluminum 60. This process is made possible because compression roller 31 applies pressure to sheet of metal 60 and die 50 in a line across the back of sheet of metal 60. Pressure is concentrated in this line. Because the aluminum used is soft and maleable, it is squeezed or forced ahead of this line of pressure as the line of pressure is progressively moved across sheet of aluminum 60 due to the rolling of compression roller 31 with respect to said sheet of metal 60 and said die 50. Thus, aluminum tends to build up slightly just ahead of compression roller 31. Then, as compression roller 31 rolls across this buildup of aluminum, aluminum is forced down into the embossing surface of die 50. The use of a nonflexible backing material would tend to distribute pressure on either side of the intended line of pressure created by the position of compression roller 31. This would obviously inhibit flow of aluminum out from under compression roller 31 and hence would inhibit the slight buildup of aluminum ahead of compression roller 31. In embossing processes where mated dies are used, there is no necessity for a line of pressure or an aluminum buildup since the metal is forced into the embossing surface of the female die by the projections of the mating male die.

As a sheet of aluminum 60 is embossed, it is degauged and stressed. It is curved in a manner which generally conforms to the curve of the compression roller 31. This degauging and stressing is an inherent result of the process since the roller tends to force the aluminum to "flow" ahead of the roller and downward into the embossing die 50. If the pattern is located only on one side of die 50 such that only one side of the surface of the sheet of aluminum 60 becomes patterned, the stressing problem is complicated since more stretching or degauging takes place in the patterned area than in the nonpatterned area with a resultant side bowing of the sheet of aluminum 60. This can be overcome by running a strip of weld or a "runner" down the side of the die which is not patterned and grinding off this weld to leave a rib approximately 0.01 inch high. This rib will stretch the other side of the sheet of aluminum 60 and thus tend to keep it straight. Some alteration may be necessary by trial and error until a satisfactory result is obtained.

In any event, it is clear that considerable stressing of the sheet of aluminum 60 will take place and it will have a curve which will tend to conform to the curve of compression roller 31. The curving of this piece as it comes beneath compression roller 31 can be seen in FIG. 5. The straightening or destressing of the embossed panel 60 begins with the preparation of a destressing sandwich. The embossed sheet of aluminum 60 is placed with its embossed surface facing upward onto a sheet of hard aluminum 62a of comparable dimensions. The embossed surface of the sheet of aluminum 60 is covered or protected by a piece of sisal paper 61. Finally, a second piece of hard aluminum 62b is placed on top of the sisal paper 61.

The total destressing operation is shown in a schematic fashion and can be followed by following the arrows and dashed lines of FIG. 7. Generally, the sandwich is curved in two opposite directions and then straightened. The destressing sandwich is first fed through a set of curving rollers and is curved in a direction which is opposite to the original curve placed on the sheet of aluminum 60 by compression roller 31. The cross-sectional appearance of the sandwich at the beginning and the end of this step are indicated in the first phase of FIG. 7. The destressing sandwich is then turned over as is indicated by the loop in the dashed line and again fed through the same set of curving rollers 70. Thus it is curved in a direction which is opposite to the curve imparted to it by its first pass through curving roller 70. Finally, the sandwich is again turned over and fed through a set of straightening rollers 71. Curving rollers 70 and straightening rollers 71 can be two identical sets of rollers wherein the adjustment or alignment of the rollers is slightly different in order to obtain a different result. The end result of the destressing operation is indicated in cross section at the end of the dashed line of FIG. 7. In effect, the embossed sheet of aluminum 60 is curved in both directions and then finally straightened. Curving the material in both directions is particularly necessary when the pattern embossed on its surface is irregular or when the pattern does not cover the full area of the sheet of aluminum 60. Sometimes when a uniform and overall pattern is imparted to the sheet of aluminum 60, merely passing the sandwich through straightening rollers 71 will destress and straighten the sheet of aluminum 50 simultaneously.

The ultimate result of this process is an embossed panel which can have a very irregular pattern and can have any number of words or messages embossed onto its surface. The manufacturer of embossed panels can offer a wide variety of such unique patterns in view of the limited expense of producing or obtaining only one embossing die which does not have to be mated with another.

It is understood that the above is merely a preferred embodiment of my invention and that a number of changes and alterations can be made thereof without departing from the spirit or broader aspects thereof.

I claim:

1. A process for embossing sheet metal such as nonheat treatable aluminum alloys and the like comprising the steps of: providing a generally flat unmated embossing die having a decorative configured surface; providing a sheet of said metal having a generally smooth surface; placing said sheet of metal on said die with said smooth surface adjacent to said embossing surface; providing a first compression member of a generally cylindrical shape; providing a second compression member; compressing said sheet of metal and said die between said first and second compression members by rolling said first compression member with respect to said sheet of metal and said die and causing said first compression member to make direct contact with said sheet of metal such that one side of said sheet of metal becomes configurated while the other side thereof remains generally smooth; destressing and straightening said sheet of metal after compression.

2. A process for embossing sheet metal such as nonheat treatable aluminum alloys and the like comprising the steps of: providing a generally flat unmated embossing die having a decorative configured surface; providing a sheet of said metal having a generally smooth surface; providing backing material of a flexible nature; placing said sheet of metal on said die with said smooth surface adjacent to said embossing surface; placing said backing material on said sheet of metal; providing a first compression member of a generally cylindrical shape; providing a second compression member; causing said first compression member to contact said backing material; compressing said backing material, said sheet of metal and said die between said first and second compression members by rolling said first compression member with respect to said backing material, said sheet of metal and said die, such that one side of said sheet becomes configurated while the other side thereof remains generally smooth; destressing and straightening said sheet of metal after compression.

3. A process for embossing sheet metal such as nonheat treatable aluminum alloys and the like comprising the steps of: providing a generally flat, unmated embossing die having a decorative configured surface; providing a sheet of metal having a generally smooth surface; placing said sheet of metal on said die with said smooth surface adjacent to said embossing surface; applying compression to said sheet of metal and said die by means of a line of pressure extending across said sheet of metal; forcing said metal to flow ahead of said line of pressure and down into said embossing surface by progressively moving said line of pressure across said sheet of metal, such that one side of said sheet becomes configurated while the other side thereof remains generally smooth; destressing and straightening said sheet of metal after said compression.

4. The process of claim 1 wherein said step of destressing said sheet of metal includes the steps of: first curving said sheet of metal in a direction opposite to the general curve which it possesses after being embossed; curving said sheet of metal in a direction opposite to the curve which it possesses after said first curving; and finally straightening said sheet of metal.

5. The process of claim 2 wherein said step of destressing said sheet of metal includes the steps of: first curving said sheet of metal in a direction opposite to the general curve which it possesses after being embossed; curving said sheet of metal in a direction opposite to the curve which it possesses after said first curving; and finally straightening said sheet of metal.

6. The process of claim 3 wherein said step of destressing said sheet of metal includes the steps of: first curving said sheet of metal in a direction opposite to the general curve which it possesses after being embossed; curving said sheet of metal in a direction opposite to the curve which it possesses after said first curving; and finally straightening said sheet of metal.

7. The process of claim 1 wherein: said step of providing a first compression member constitutes providing a compression roller of a generally cylindrical shape rotatable about a central axis through the length thereof; said step of providing a second compression member constitutes providing a table having a generally planar surface movable with respect to said compression roller in a direction perpendicular to the central axis of said compression roller; and said process also includes the steps of: providing means for adjusting the distance between said compression roller and said generally planar surface of said tables; adjusting the distance between said compression roller and said surface of said table such that said sheet of metal will be embossed by said die when passed beneath said compression roller; placing said die and said sheet of metal on said table with said die adjacent said table; providing means for moving said table with respect to said compression roller; and moving said table with respect to said compression roller.

8. The process of claim 2 wherein: said step of providing a first compression member constitutes providing a compression roller of a generally cylindrical shape rotatable about a central axis through the length thereof; said step of providing a second compression member constitutes providing a table having a generally planar surface movable with respect to said compression roller in a direction perpendicular to the central axis of said compression roller; and said process also includes the steps of: providing means for adjusting the distance between said compression roller and said generally planar surface of said tables; adjusting the distance between said compression roller and said surface of said table such that said sheet of metal will be embossed by said die when passed beneath said compression roller; placing said die, sheet of metal, and said backing on said table with said die adjacent said table; providing means for moving said table with respect to said compression roller; and moving said table with respect to said compression roller.

9. The process of claim 7 wherein said step of destressing said sheet of metal includes the steps of: first curving said sheet of metal in a direction opposite to the general curve which it possesses after being embossed; curving said sheet of metal in a direction opposite to the curve which it possesses after said first curving; and finally straightening said sheet of metal.

10. The process of claim 8 wherein said step of destressing said sheet of metal includes the steps of: first curving said sheet of metal in a direction opposite to the general curve which it possesses after being embossed; curving said sheet of metal in a direction opposite to the curve which it possesses after said first curving; and finally straightening said sheet of metal.

11. The process of claim 7 which also includes the step of initiating rotation in said compression roller, prior to said step of compressing, sufficient to make the linear speed on the circumference of said roller correspond to the rate of movement of said table when it is moved.

12. The process of claim 8 which also includes the step of initiating rotation in said compression roller, prior to said step of compressing, sufficient to make the linear speed on the circumference of said roller correspond to the rate of movement of said table when it is moved.

13. The process of claim 9 which also includes the step of initiating rotation in said compression roller, prior to said step of compressing, sufficient to make the linear speed on the circumference of said roller correspond to the rate of movement of said table when it is moved.

14. The process of claim 10 which also includes the step of initiating rotation in said compression roller, prior to said step of compressing, sufficient to make the linear speed on the circumference of said roller correspond to the rate of movement of said table when it is moved.

15. An apparatus for embossing sheet metal comparable to nonheat treatable aluminum alloys comprising: a compression roller of a generally cylindrical shape rotatable about a central axis through the length thereof; a table having a generally planar surface movable with respect to said compression roller, said table being disposed generally beneath said compression roller; means for forcing said compression roller upwardly away from said table; means for limiting the extent to which said compression roller can be forced upwardly; said limiting means being adjustable vertically whereby the extent to which said forcing means can force said compression roller upwardly can be varied and accordingly, the distance between said compression roller and said generally planar surface of said table; means for moving said table with respect to said cylindrical compression roller in either of two opposite directions.

16. The apparatus of claim 15 wherein said compression roller is mounted between two towers, said towers being disposed on either side of said table; said forcing means comprising hydraulic cylinders mounted in said towers, said compression roller being supported by said hydraulic cylinders; said limiting means comprising adjustment screws in the upper portions of said towers which rest against the tops of said towers and which counteract the supporting force supplied by said cylinders; means being provided for turning said adjusting screws upwardly or downwardly.

17. The apparatus of claim 15 which also includes: means for stopping the movement of said table when it is disposed generally at either side of said compression roller; and means for initiating movement in said table when it is disposed generally at either side of said table such that said embossing of said sheet metal can be initiated from either side of said compression roller.

18. The apparatus of claim 16 which also includes: means for stopping the movement of said table when it is disposed generally at either side of said compression roller; and means for initiating movement in said table when it is disposed generally at either side of said table such that said embossing of said sheet metal can be initiated from either side of said compression roller.

19. The method of claim 3 in which said destressing and straightening step comprises: preparing a destressing sandwich by placing said embossed sheet of metal, with its embossed surface facing upwardly on a first sheet of metal; placing a protective sheet of flexible material on the embossed surface of said sheet of metal; placing a second sheet of metal on said protective sheet; curving said sandwich in a direction opposite to the general curve which it possesses after being embossed; then curving said sandwich in a direction opposite to the curve which it possesses after said first curving; and finally straightening said sheet of metal.

20. The method of claim 3 which includes the step of running a raised bead along the top, flat surface of said generally flat die at either side of the area which is decoratively configurated, prior to applying compression to said sheet of metal on said die.

21. The method of claim 1 which comprises positioning said first compression member sufficiently close to said second compression member that said sheet of metal becomes configurated as it passes between said first and second compression members; passing a plurality of sheets between said first and second compression members without changing their relative positions at any time.

22. The method of claim 2 which comprises positioning said first compression member sufficiently close to said second compression member that said sheet of metal becomes configurated as it passes between said first and second compression members; passing a plurality of sheets between said first and second compression members without changing their relative positions at any time.